United States Patent
Cox et al.

(10) Patent No.: US 9,998,559 B2
(45) Date of Patent: *Jun. 12, 2018

(54) PREEMPTIVE CACHING OF DATA

(71) Applicant: International Business Machines Corporation, Armonk, NY (US)

(72) Inventors: John S. Cox, Apex, NC (US); Gennaro A. Cuomo, Durham, NC (US); Todd E. Kaplinger, Raleigh, NC (US); Christopher C. Mitchell, Raleigh, NC (US); Victor S. Moore, Lake City, FL (US); Gregory L. Truty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/198,661

(22) Filed: Mar. 6, 2014

(65) Prior Publication Data

US 2014/0189044 A1    Jul. 3, 2014

Related U.S. Application Data

(63) Continuation of application No. 13/669,684, filed on Nov. 6, 2012.

(51) Int. Cl.
   *G06F 15/167* (2006.01)
   *H04L 29/08* (2006.01)
   *G06F 17/30* (2006.01)

(52) U.S. Cl.
   CPC .... *H04L 67/2852* (2013.01); *G06F 17/30902* (2013.01)

(58) Field of Classification Search
   None
   See application file for complete search history.

(56) References Cited

U.S. PATENT DOCUMENTS

| | | | | |
|---|---|---|---|---|
| 6,308,216 | B1 * | 10/2001 | Goldszmidt | H04L 12/2602 709/224 |
| 8,285,808 | B1 * | 10/2012 | Joel | G06F 17/30905 345/473 |
| 8,769,614 | B1 * | 7/2014 | Knox et al. | 726/3 |
| 2002/0124055 | A1 | 9/2002 | Reisman | |
| 2007/0033569 | A1 * | 2/2007 | Davidson et al. | 717/103 |

(Continued)

OTHER PUBLICATIONS

Ananthanarayanan et al. "OWeB: A Framework for Offline Web Browsing". Proceedings of the Fourth Latin American Web Congress (LA-WEB'06) 2006 IEEE.

(Continued)

*Primary Examiner* — Mohamed Ibrahim
(74) *Attorney, Agent, or Firm* — Gilbert Harmon, Jr.

(57) ABSTRACT

A first computing device receives a first request from a client computing device, wherein the first request includes a markup language request. The first computing device transmits the first request to a second computing device, wherein the second computing device services the first request. The first computing device receives the serviced first request, wherein the serviced first request includes a manifest tag. The first computing device caches the serviced first request. The first computing device transmits the serviced first request to the client computing device.

5 Claims, 4 Drawing Sheets

(56) References Cited

U.S. PATENT DOCUMENTS

| | | | |
|---|---|---|---|
| 2007/0257247 A1* | 11/2007 | Ando et al. ................ | 257/3 |
| 2008/0229020 A1* | 9/2008 | Plamondon ................ | 711/122 |
| 2008/0229023 A1* | 9/2008 | Plamondon ................ | 711/126 |
| 2010/0235580 A1* | 9/2010 | Bouvier ................ | 711/129 |
| 2012/0185608 A1* | 7/2012 | McGowan et al. ........... | 709/231 |
| 2013/0219383 A1* | 8/2013 | Hilerio et al. ............... | 717/178 |
| 2014/0006539 A1* | 1/2014 | Kaplinger et al. ............ | 709/213 |

OTHER PUBLICATIONS

"5.7 Offline Web applications—HTML5 A Vocabulary and Associated APIs for HTML and XHTML". Revision 1.5697. Retrieved on Jul. 6, 2012. URL<//http://dev.w3.org/html5/spec/offline.html#offline>.

U.S. Appl. No. 13/669,684, filed Nov. 6, 2012, "Preemptive Caching of Data".

* cited by examiner

PREEMPTIVE CACHING OF DATA

CROSS REFERENCE TO RELATED APPLICATION

This application is a continuation of U.S. patent application Ser. No. 13/669,684 filed Nov. 6, 2012, the entire content and disclosure of which is incorporated herein by reference.

FIELD OF THE INVENTION

The present invention relates generally to the field of data caching and more particularly to the caching of web application resources.

BACKGROUND OF THE INVENTION

Clients interact with Web-based applications and documents over a collection of computers and other hardware components interconnected by communication channels that allow sharing of resources and information, collectively known as the Internet. Such interaction requires an open communication channel between a client's computing device and the internet. Web-based applications and documents are often displayed through a web browser, which retrieves, presents, and traverses information resources available on the internet. Web applications and documents may include resources identified by a uniform resource locator (URL) that serves as a reference to an Internet resource. One particular type of URL is the Hyper Text Markup Language (HTML). Web browsers interpret the HTML code that is included in web applications and documents and composes them into visible or audible web pages.

A web browser composes a web page by retrieving resources (e.g. HTML files or the output of an executable residing on a host-server) from the web page's host-server each time the web browser is required to compose that particular webpage. Having all of the resources necessary to compose a web page ensures that the web page loads and operates correctly in the web browser. HTML code has elements that may include attributes, for example, a manifest attribute. The manifest attribute is a software storage feature that provides the ability to access a web application or document without a network connection once the required resources have been cached on a computing device. Furthermore, the manifest attribute specifies an application cache manifest, which is a file that lists the resources required by a web browser to properly display that particular webpage. When connecting to a network for the first time, a web browser reads the cache manifest file, downloads the resources included in the cache manifest file and caches them in memory. Then, in the absence of a network connection, the web browser retrieves the required resources from the cache and renders the web application offline utilizing the cached resources.

SUMMARY

Embodiments of the present invention provide a method, system, and program product to cache data. A first computing device receives a first request from a client computing device, wherein the first request includes a markup language request. The first computing device transmits the first request to a second computing device, wherein the second computing device services the first request. The first computing device receives the serviced first request, wherein the serviced first request includes a manifest tag. The first computing device caches the serviced first request. The first computing device transmits the serviced first request to the client computing device.

In certain embodiments, the manifest tag includes an application cache manifest file; the first computing device transmits a second request to the second computing device, wherein the second request includes a request for the application cache manifest file included in the manifest tag, and wherein the second computing device services the second request; the first computing device receives the serviced second request from the second computing device, wherein the serviced second request includes the application cache manifest file; and the first computing device caching the application cache manifest file.

In additional embodiments, the application cache manifest file includes a resource file; the first computing device determines the resource file listed in the application cache manifest file; the first computing device transmits a third request to the second computing device, wherein the third request includes a request for the determined resource file identified in the application cache manifest file, and wherein the second computing device services the third request; the first computing device receives the serviced third request from the second computing device, wherein the serviced third request includes the determined resource file identified in the application cache manifest file; and the first computing device caches the resource file.

In other embodiment, the first computing device transmits the application cache manifest file, resource file, or both to the client computing device. In yet still an additional embodiment, the computing device is an edge server that supports batch processing.

DETAILED DESCRIPTION

Figure 1:
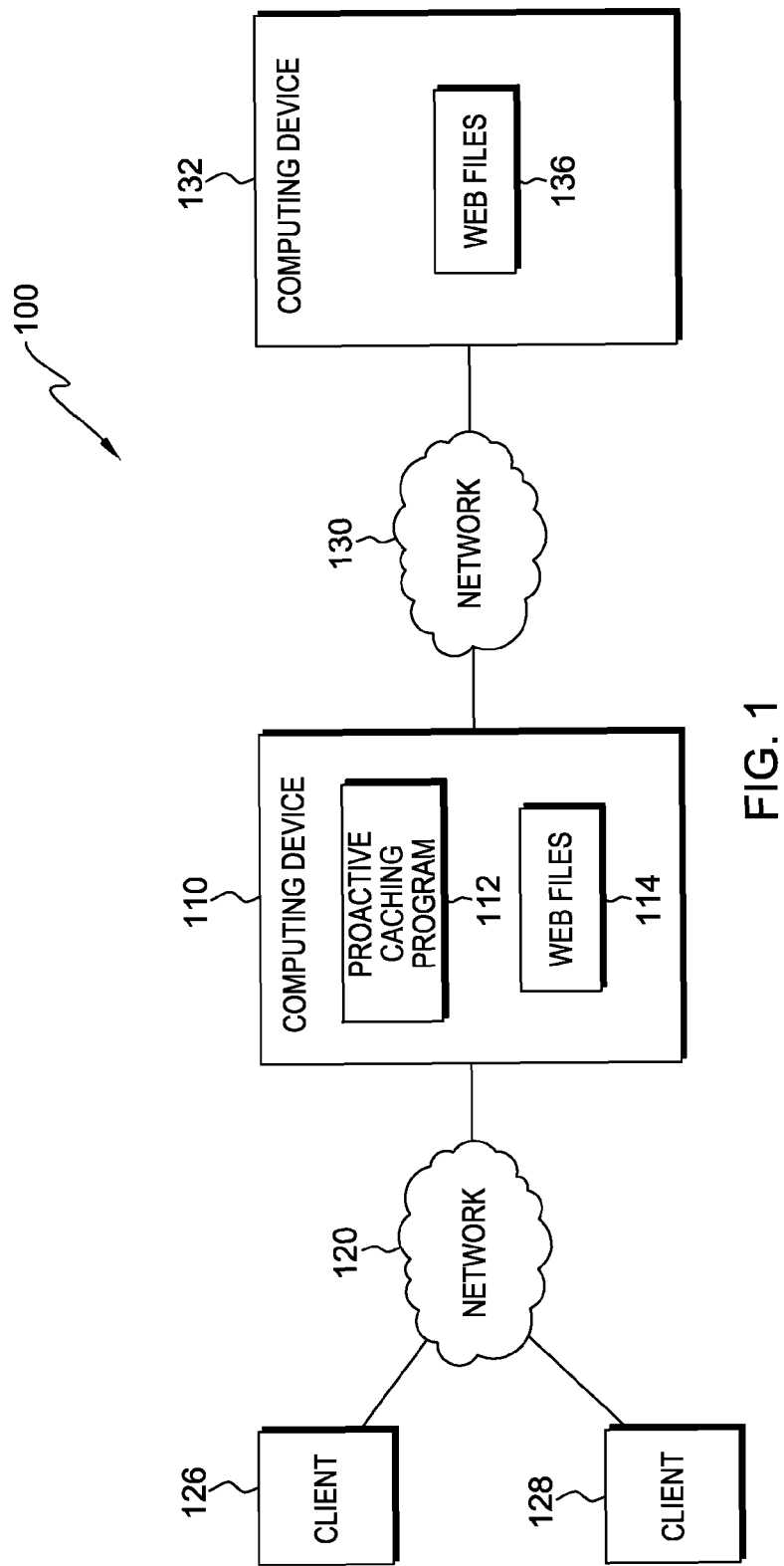
FIG. 1 is a functional block diagram illustrating a proactive caching environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a proactive caching environment, generally designated 100, in accordance with one embodiment of the present invention. Proactive caching environment 100 includes client 126, client 128, and computing device 110, connected via network 120. Further, proactive caching environment 100 also includes computing device 132, which is connected via network 130 to computing device 110. Network 120 and network 130 may be wired, wireless, or both, and include, without limitation, one or more local area networks (LANs) and/or wide area networks (WANs). Although network 120 and network 130 are depicted as separate entities in FIG. 1 each may be included in the same network in other embodiments. Further, network 120 and network 130 can be connected by additional connectivity components than those depicted in FIG. 1. In general, each of network 120 and network 130 can be any combination of connections and protocols that will support communications via various channels between client 126, client 128, computing device 110, and computing device 132, in accordance with an embodiment of the invention.

In various embodiments, each of client 126, client 128, computing device 110, and computing device 132, can include a laptop, tablet, or netbook personal computer (PC), a desktop computer, a personal digital assistant (PDA), a smart phone, a mainframe computer, or a networked server computer. Further, computing device 110 and computing device 132 can represent computing systems utilizing clustered computers and components to act as single pools of seamless resources when accessed through either network 120 or network 130, or can represent one or more cloud computing datacenters. In general, each of client 126, client 128, computing device 110, and computing device 132 can be any programmable computing device as described in further detail below with respect to FIG. 4.

Client 126 and client 128 may be distinct and separate entities that can perform substantially the same functions. In some examples, client 126 and client 128 may generate HTML requests, transmit HTML requests, and receive the product of serviced HTML requests, in accordance with an embodiment of the present invention. Furthermore, client 126 and client 128 may include distinct copies of the same software or the same program. In general, client 126 and client 128 may be any computing device capable of generating markup language requests, transmitting markup language requests, and receiving the product of serviced markup language requests.

In an embodiment of the present invention, computing device 110 includes proactive caching program 112 and web files 114. Proactive caching program 112, the operation of which is explained in greater detail below with respect to FIG. 3, can operate to determine novel HTML requests, transmit novel HTML requests, service HTML requests, receive serviced HTML requests, cache products of serviced HTML requests, and transmit the cached products of serviced HTML requests. Further, proactive caching program 112 may determine whether or not to service a HTML request received from a requesting client utilizing the files included in web files 114, for example, client 126 or client 128. Further still, proactive caching program 112 may transmit HTML requests to a computing device within proactive caching environment 100 for servicing, for example, computing device 132. Furthermore, proactive caching program 112 may cache products of serviced HTML requests (files), for example, in web files 114, and transmit the cached files to the requesting client. In an embodiment, web files 114 may be included in cache 416, discussed in further detail below in reference to FIG. 4. In an embodiment, web files 114 may include any file that is necessary to properly display a web application within a web browser off-line.

Computing device 132 includes web files 136, which, similar to web files 114 described above, can be any file required by a web browser to properly display a web application off-line. Computing device 132 can receive HTML requests from a requesting computer device, for example, computing device 110. Further, computing device 132 can service HTML requests by utilizing files included in web files 136. Further still, computing device 132 may transmit the serviced HTML requests to the requesting computing device. Exemplary request/response cycles between client 126 and computing device 110, client 128 and computing device 110, as well as those between computing device 110 and computing device 132, are discussed below with reference to FIG. 2.

Figure 2:
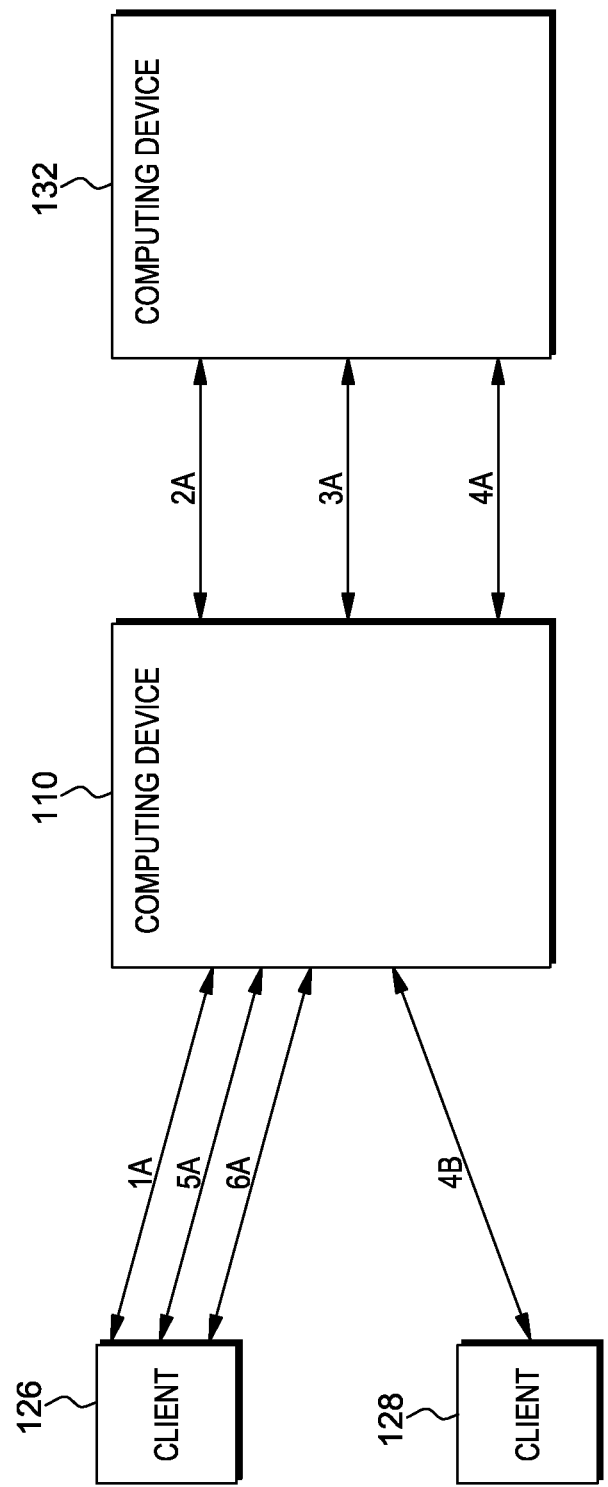
FIG. 2 illustrates exemplary request/response cycles that may occur within the proactive caching environment of FIG. 1, in accordance with an embodiment of the present invention.

Having described an overview of an exemplary operating environment in which embodiments of the present invention may be implemented we turn now to FIG. 2, which illustrates exemplary request/response cycles that may occur within the proactive caching environment of FIG. 1, in accordance with an embodiment of the present invention. It should be understood that these and other exchanges described herein are set forth only as examples. Other exchanges and elements (e.g., machines, interfaces, functions, orders, and groupings of functions, ect.) can be used in addition to or instead of those shown, and some elements may be omitted altogether. Further, many of the elements described herein are functional entities that may be implemented as discrete or distributed components or in conjunction with other components, and in any suitable combination and location. Many of the functions described herein as being performed by one or more entities may be carried out by hardware, firmware, and/or software.

Here, we begin with a discussion of an exemplary set of request/response cycles (1A through 6A) that results when proactive caching program 112 registers a cache miss in an attempt to service a HTML request from a client within the proactive caching environment of FIG. 1. Exchange 1A represents a request/response cycle between client 126 and computing device 110. In particular, the request/response cycle in exchange 1A includes a request for a HTML file transmitted from client 126 to computing device 110. In response to computing device 110 receiving the first request A, proactive caching program 112 determines that first request A identifies a HTML file that is not included in cache 416 (e.g. cache miss). In response to said determination, proactive caching program 112 initiates exchange 2A, which is a request/response cycle between computing device 110 and computing device 132. In particular, the request/response cycle in exchange 2A includes computing device 110 transmitting first request A to computing device 132 for servicing. Computing device 132 services first request A by determining the HTML file identified in the request, retrieving the determined file from HTML files 136. Computing device 132 concludes exchange 2A by transmitting the serviced first request A to computing device 110.

In response to computing device 110 receiving the serviced first request A, proactive caching program 112 caches the contents of the serviced first request A (the HTML file) in web files 114. Proactive caching program 112 then concludes exchange 1A by transmitting the contents of serviced first request A (the HTML file) to client 126. Because proactive caching program 112 determined that first request A included a novel request, proactive program 112 must determine whether files included in serviced requests include a manifest tag and if so, retrieve and cache all related files necessary to properly display the HTML file within a web browser.

As such, proactive caching program 112 determines that the HTML file included in the serviced first request A contains a manifest tag, which identifies an application cache manifest file. In response to said determination, proactive caching program 112 initiates exchange 3A between computing device 110 and computing device 132. In particular, a request/response cycle in exchange 3A includes proactive caching program 112 transmitting a request for the determined application cache manifest file to computing device 132 (second request A) for servicing. Computing device 132 services second request A by determining the application cache manifest file identified in the second request A and retrieving the determined application cache manifest file from web files 136. Computing device 132 concludes exchange 3A by transmitting the serviced second request A (which includes the retrieved application cache manifest file) to computing device 110. Computing device 110 receives the serviced second request A and proactive caching program 112 caches the retrieved application cache manifest file in web files 114.

In an exemplary embodiment, proactive caching program 112 determines if the application cache manifest file included in the serviced second request A identifies a resource file. In response, proactive caching program 112 determines that the resource file is not included in web files 114. In response to said determination, proactive caching program 112 initiates exchange 4A between computing device 110 and computing device 132. In particular, the request/response cycle in exchange 4A includes proactive caching program 112 transmitting a request identifying the resource file (third request A) to computing device 132 for servicing. Computing device 132 receives and services the request by determining the resource file identified therein and retrieving the resource file from web files 136. Computing device 132 concludes exchange 4A by transmitting the serviced third request A (the resource file) to computing device 110. Computing device 110 receives the serviced third request A and caches the resource file included therein in web files 114.

Client 126 initiates exchange 5A in response to determining that the HTML file included in exchange 1A includes a manifest tag that identifies an application cache manifest file. Exchange 5A represents a request/response cycle between client 126 and computing device 110. In particular, the request/response cycle in exchange 5A includes client 126 transmitting a request for the application cache manifest file to computing device 110 (fourth request A) for servicing. Proactive caching program 112 receives the request and determines that the application cache manifest file is included in web files 114 and services fourth request A. Proactive caching program 112 services the fourth request A by determining that the application cache manifest file identified therein is included in web files 114 and retrieving the determined application cache manifest file from web files 114. Proactive caching program 112 concludes exchange 5A by transmitting the serviced fourth request A to client 126. Client 126 receives the serviced fourth request A and determines that the application cache manifest file included therein identifies a resource file.

In response to said determination, client 126 initiates exchange 6A, which is a request/response cycle between client 126 and computing device 110. In particular, the request/response cycle in exchange 6A includes client 126 transmitting a request for the resource file to computing device 110 (fifth request A) for servicing. Proactive caching program 112 services fifth request A by determining the resource file identified in the fifth request A and retrieving said resource file from web files 114. Proactive caching program 112 concludes exchange 6A by transmitting the serviced fifth request A to client 126.

Having described exemplary exchanges that may occur as computing proactive caching program 112 registers a cache miss in an attempt to service a HTML request received from a client, we turn now to a discussion of an exemplary exchange that may occur in response to proactive caching program 112 registering a cache hit in an attempt to service a request from a client within the proactive caching environment of FIG. 1. Exchange 1B represents a request/response cycles between client 128 and computing device 110. In particular, the request/response cycle in exchange 1B includes client 128 initiating the exchange by transmitting a request for a HTML file to computing device 110 (request B) for servicing. Proactive caching program 112 receives, via computing device 110, request B and services it. Proactive caching program 112 services request B by determining that the HTML file identified in the request is included in web files 114 (cache hit). In response to said determination, proactive caching program 112 retrieves the HTML file from web files 114. In response to said retrieval, proactive caching program 112 determines that the retrieved HTML file includes a manifest tag. In response to said determination, proactive caching program 112 retrieves the application cache manifest file identified in manifest tag. Subsequently, proactive caching program 112 determines that the application cache manifest file includes a resource file. Subsequently, proactive caching program 112 determines that the resource file is included in web files 114. Subsequent to said determination, proactive caching program 112 retrieves the resource file from web files 114. Subsequent to said retrieval, proactive caching program 112 concludes the request/response cycle of exchange 1B by transmitting the retrieved HTML file, application cache manifest file, and resource file to client 128.

Client 128 receives serviced request B (the HTML file) from computing device 110 and determines that the HTML file identifies an application cache manifest file. In response to said determination, client 128 initiates a second request/response cycle between itself and computing device 110. Client 128 transmits a request for the identified application cache manifest file (second request B) to computing device 110 for servicing. Proactive caching program 112 services the second request B by determining the application cache manifest file indentified in the request and retrieving the application cache manifest file from web files 114. Proactive caching program 112 concludes the second request/response cycle by transmitting the serviced second request B to client 128.

Client 128 receives the transmitted application cache manifest file and determines that the file identifies a resource file required to properly display the HTML file included in the serviced first request B. In response to said determination, client 128 transmits a request for file to computing device 110 (third request B) for servicing. Proactive caching program 112 receives, via computing device 110, the third request B and services the request by determining the resource file identified in the third request B and retrieving the determined resource file from web file 114. Proactive caching program 112 concludes the third request/response cycle, and hence, exchange 1B, by transmitting the serviced third request to client 128.

Having described exemplary exchanges that may occur within the proactive caching environment of FIG. 1, an exemplary method for caching data is described below in relation to FIG. 3, in accordance with an embodiment of the present invention.

Figure 3:
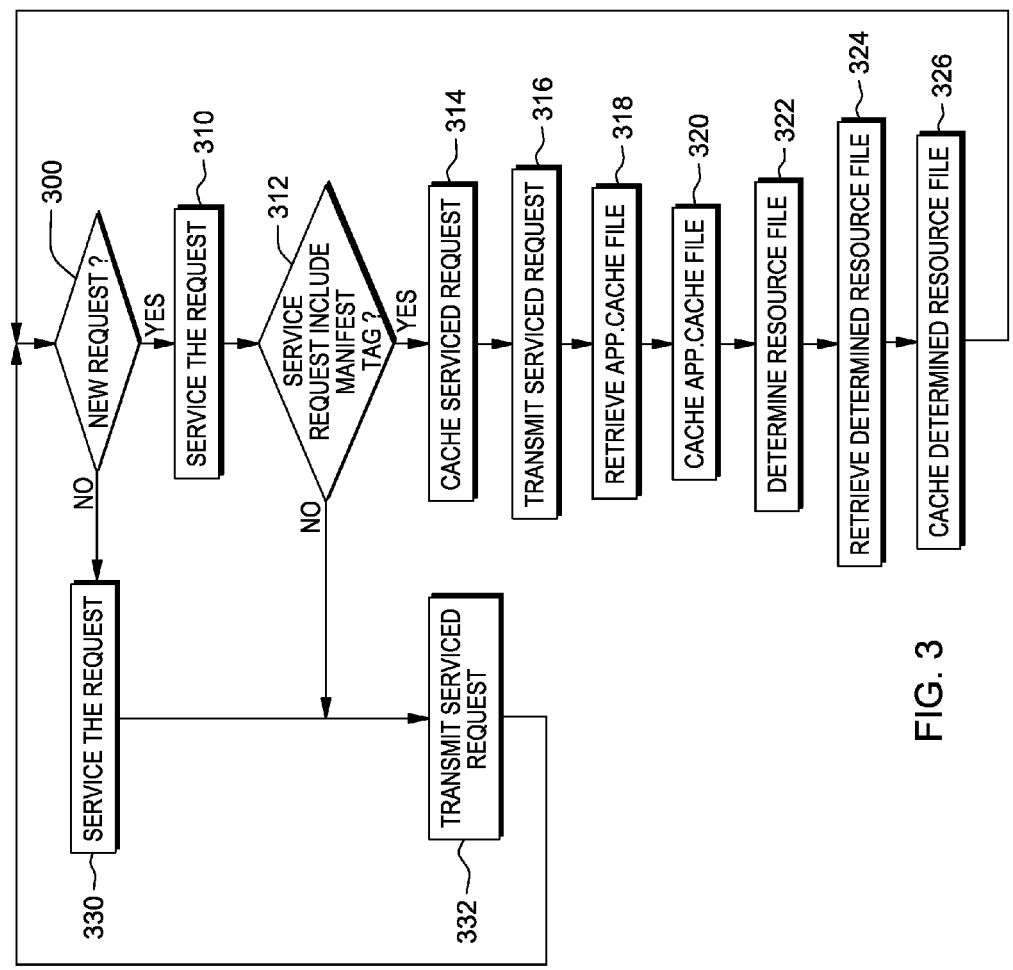
FIG. 3 illustrates the operational steps of a proactive caching program, running on a computing device within the proactive caching environment of FIG. 1, in accordance with an embodiment of the present invention.

FIG. 3 illustrates the operational steps a proactive caching program, running on a computing device within the proactive caching environment of FIG. 1, in accordance with an embodiment of the present invention. Proactive caching program 112 monitors incoming requests from clients that are located within proactive caching environment 100, for example, client 126 and client 128. In response to receiving a request from a client, proactive caching program 112 determines whether the request is novel (step 300). For example, a request may identify a HTML file, application cache manifest file, resource file, or any combination thereof. If proactive caching program 112 determines that the request is not novel ("no" branch of decisional 300), then proactive caching program 112 services the request (step 330). In response to servicing the request, proactive caching program 112 transmits the serviced request to the client (step 332).

If proactive caching program 112 determines that the request is novel ("yes" branch of decisional 300), then proactive caching program 112 services the request (step 310). For example, proactive caching program 112 may service the request by transmitting the request to a computing device capable of servicing the request, for example, computing device 132, for servicing. In response to servicing the request, computing device 132 transmits the serviced request to computing device 110. In response to receiving the serviced request, proactive caching program 112 determines whether the service request includes a manifest tag (decisional 312). If the serviced request does not include a manifest tag ("no" branch decisional 312), then proactive caching program 112 transmits the serviced request to the client (step 332).

In contrast, if the serviced request includes a manifest tag ("yes" branch decisional 312), then proactive caching program 112 caches the serviced request (step 314). In response to caching the serviced request, proactive caching program 112 transmits the serviced request to the client (step 316). Subsequently, proactive caching program 112 retrieves the application cache manifest file identified in the manifest tag (step 318). For example, proactive caching program 112 may retrieve the application cache manifest file identified in the manifest tag by transmitting a request for the application cache manifest file to a computing device capable of servicing the request, for example, computing device 132. Computing device 132 services the request and, in response to servicing the request, computing device 132 transmits the serviced request to proactive caching program 112, via computing device 110.

In response to receiving the serviced request (the application cache manifest file), proactive caching program 112 caches the application cache manifest file (step 320). In response to caching the application cache manifest file, proactive caching program 112 determines the resource file identified in the application cache manifest file (step 322). In response to said determination, proactive caching program 112 retrieves the determined resource file (step 324). For example, proactive caching program 112 may retrieve the determined resource file by transmitting a request for the determined resource file to a computing device within the proactive caching environment 100 capable of servicing the request, for example, computing device 132, for servicing. Computing device 132 services the request and, in response to said servicing, transmits the serviced request (the resource file) to computing device 110. In response to receiving the serviced request, proactive caching program 112 caches the resource file (step 326).

Figure 4:
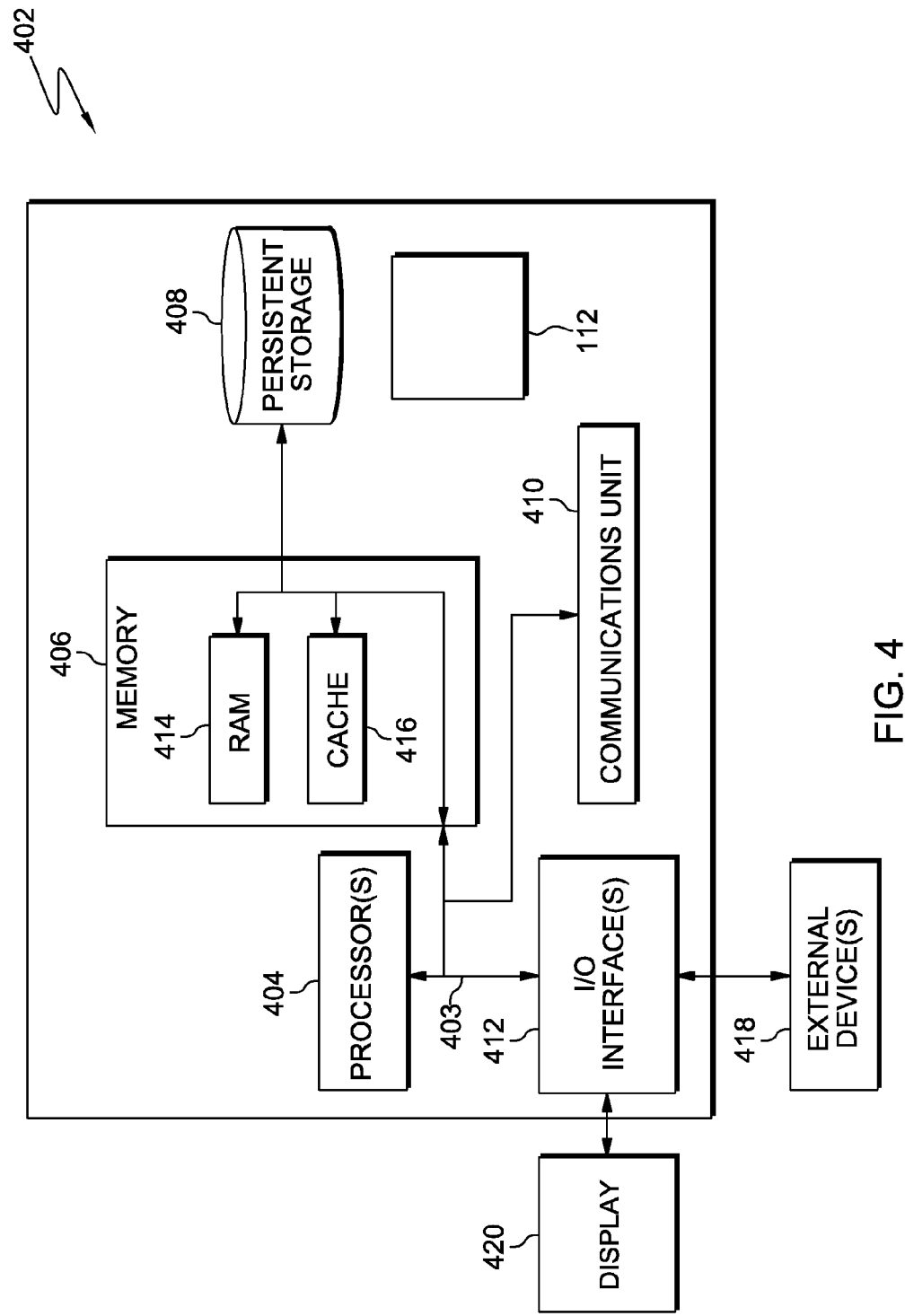
FIG. 4 depicts a block diagram of components of the computing devices of FIG. 1, in accordance with an embodiment of the present invention.

FIG. 4 depicts a block diagram of components of proxy server computer 402. Proxy server computer 402 is one embodiment of computing device 110, discussed above in connection with FIGS. 1 to 3. Computers with similar hardware to proxy server computer 402 may be used as other computers in environment 100, discussed above in connection with FIG. 1, such as client 126, client 128, and computing device 132. It should be appreciated that FIG. 4 provides only an illustration of one implementation and does not imply any limitations with regard to the environment in which different embodiments may be implemented. Many modifications to the depicted environment may be made.

As shown in FIG. 4, proxy server computer 402 includes communications fabric 403, which provides communications between computer processor(s) 404, memory 406, persistent storage 408, communications unit 410, and input/output (I/O) interface(s) 412.

Memory 406 and persistent storage 408 are examples of computer-readable storage devices and media. Memory 406 may be, for example, one or more random access memories (RAM) 414, cache memory 416, or any other suitable volatile or non-volatile storage device.

Proactive caching program 112 is stored in persistent storage 408 of proxy server computer 402 for execution by one or more of the respective computer processors 404 via one or more memories of memory 406. In the embodiment illustrated in FIG. 4, persistent storage 408 includes flash memory. Persistent storage 408 may also include web files 136 for storing web files. Alternatively, or in addition to flash memory, persistent storage 408 may include a magnetic disk storage device of an internal hard drive, a solid state drive, a semiconductor storage device, read-only memory (ROM), EPROM, or any other computer-readable storage device that is capable of storing program instructions or digital information.

The media used by persistent storage 408 may also be removable. For example, a removable hard drive may be used for persistent storage 408. Other examples include an optical or magnetic disk that is inserted into a drive for transfer onto another storage device that is also a part of persistent storage 408, or other removable storage devices such as a thumb drive or smart card.

Communications unit 410, in these examples, provides for communications with other data processing systems or devices. In these examples, communications unit 410 includes one or more network interface cards. Communications unit 410 may provide communications through the use of either or both physical and wireless communications links. Proactive caching program 112 may be downloaded to persistent storage 408 through communications unit 410.

I/O interface(s) 412 allows for input and output of data with other devices that may be connected to proxy server computer 102. For example, I/O interface 412 may provide a connection to external devices 418 such as a keyboard, keypad, a touch screen, and/or some other suitable input device. I/O interface(s) may also connect to a display 420. External devices 418 can also include portable computer-readable storage media such as, for example, thumb drives, portable optical or magnetic disks, and memory cards. Software and data used to practice embodiments of the present invention, e.g. proactive caching program 112, web files 114, and web files 136, can be stored on such portable computer-readable storage media and can be loaded onto persistent storage 408 via I/O interface(s) 412. I/O interface(s) also connects to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for use with a proxy server computer in making network communications including proactive caching communications using a markup language manifest, the method comprising:

the proxy server computer system receiving a first request through a network from a first client computing device, wherein the first request includes a markup language request that requests a first markup language element that includes-a first manifest attribute identifying, a manifest tag and associated application cache manifest file comprising at least, a first resource needed to use the first markup language element;

the proxy server computer system transmitting, as a proxy for the first client computing device, the first request through the network to a first server computing device, in a manner so that the first server computing device will service the first request;

the proxy server computer system receiving the first markup language element through the network from the first server computing device;

responsive to the receipt of the first markup language element, the proxy server computer system inspecting the first markup language element to determine the identity of the first resource of the first manifest attribute of the first markup language element, based on the manifest tag;

the proxy server computer system transmitting the first markup language element through the network to the first client computing device;

responsive to the determination of the identity of the first resource, the proxy server computer system obtaining the first resource identified in the first manifest attribute of the first markup language element and proactively caching the first resource in the proxy server computer system based on the manifest tag wherein the proxy server computer system supports batch processing.

2. The method of claim 1 further comprising:

transmitting, by the proxy computer server system and responsive to a second request from the first client computing device, the first resource through the network to the first client computing device;

wherein the proxy server computer system obtains the first resource prior to receiving the second request from the first client computing device.

3. The method of claim 1 wherein the first manifest attribute identifies a plurality of resources needed to use the first markup language element, the method further comprising:

inspecting, by the proxy server computer system and responsive to the of the first markup language element, the first markup language element to determine the identity of all resources identifies by the first manifest attribute; and obtaining, by the proxy server computer system through the network and responsive to the determination of the identity of all resources of the plurality of resources, all resources identified in the first manifest attribute of the first markup language element.

4. The method of claim 1 further comprising:

transmitting, responsive to a first request from a second client computing device, the first resource, from the proxy server computer system, through the network to the second client computing device wherein the proxy server computer system obtains the first resource prior to receiving the first request from the second client computing device.

5. The method of claim 1 wherein the proxy server computer system is an edge server.

* * * * *